(No Model.)  H. KENNEDY.  2 Sheets—Sheet 1.
FLEXIBLE JOINT PACKING.

No. 351,605.  Patented Oct. 26, 1886.

WITNESSES:  INVENTOR:
Robert Kirk  Hosea Kennedy.
Dugald McKillop.  By J. S. ____
  Attorney.

(No Model.) 2 Sheets—Sheet 2.

H. KENNEDY.
FLEXIBLE JOINT PACKING.

No. 351,605. Patented Oct. 26, 1886.

WITNESSES:
Robert Kirk
C. D. Zerbe

INVENTOR:
Hosea Kennedy
J. S. Zerbe
his Attorney.

UNITED STATES PATENT OFFICE.

HOSEA KENNEDY, OF ROSE POINT, PENNSYLVANIA.

FLEXIBLE-JOINT PACKING.

SPECIFICATION forming part of Letters Patent No. 351,605, dated October 26, 1886.

Application filed February 27, 1886. Serial No. 193,461. (No model.)

*To all whom it may concern:*

Be it known that I, HOSEA KENNEDY, of Rose Point, in the county of Lawrence and State of Pennsylvania, have invented a new and useful Improvement in Flexible-Joint Packings, which improvement is fully set forth in the following specification and accompanying drawings, in which—

Figure 1:
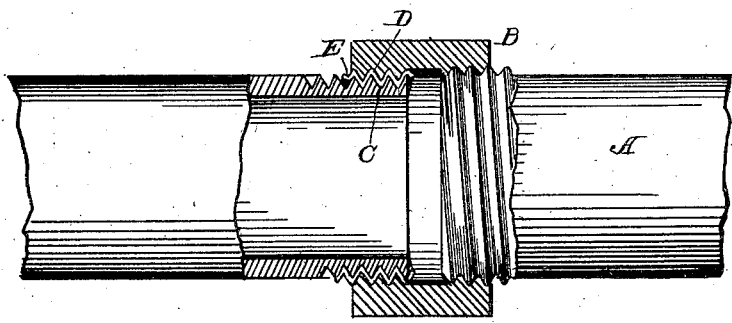
Figure 2:
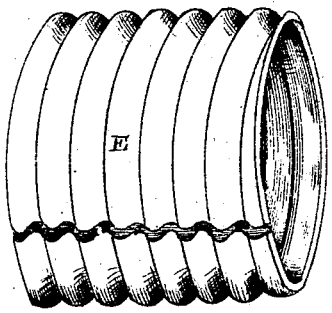

Figure 1 is a longitudinal section of my improved joint-packing. Fig. 2 is a perspective view of the packing ready for use.

This device has reference to an improvement in joint-packings for gas and oil pipes, so that the joint, instead of being rigid, as heretofore, may be made flexible, and thus used in cases where the pipes are large and run along the surface of the ground, around curves, and over hills and hollows without bursting, or putting them together in cast-iron collars. A provision of this kind is necessary in laying oil-pipe and natural-gas pipe lines. This I accomplish by enlarging the bore of the collar to receive the ends of the pipe, so as to introduce a ply of leather, all of which will now be fully set forth in detail.

In the accompanying drawings, A represents an ordinary oil or gas pipe, and B the collar connecting the joints. The usual male screw, C, and the female screw D are provided in the ends of the pipes, and the collar B has any ordinary gas or oil pipe, with the exception that the bore of the collar B is made somewhat larger than the ends of the pipe. In order that the joint may be tight and at the same time flexible, I introduce a ply of leather, E, within this joint, between the said male screw C and female screw D. This leather or packing is made cylindrical or tubular and corrugated, so as to be fitted close upon the screw end C of one pipe and between it and the internal screw, D, in the end of the other pipe.

It is obvious that, instead of using a single ply of leather, a number of them, as desired or found necessary, may be used; and it is also clear that, instead of using leather, any other flexible and suitable material may be used.

The object and use of this device are quite obvious, as by means of it the joint may be made flexible, thus permitting the pipe running along on uneven ground and over hollows, and at the same time the introduction of the leather dispenses with soldering or calking of the joints.

Having described my invention, what I claim is—

The combination of the pipe A, the collar B, the male screw C, and female screw D, with the cylindrical or tubular and corrugated packing E, the whole arranged as and for the purpose substantially as herein set forth and described.

In testimony that I claim the foregoing I have hereunto set my hand, this 20th day of January, 1886, in the presence of witnesses.

HOSEA KENNEDY.

Witnesses:
GEO. W. MILLER,
R. M. ALLEN.